US010689769B2

(12) United States Patent
Clarke et al.

(10) Patent No.: US 10,689,769 B2
(45) Date of Patent: Jun. 23, 2020

(54) ELECTRODEPOSITED LEAD COMPOSITION, METHODS OF PRODUCTION, AND USES

(71) Applicant: Aqua Metals Inc., Alameda, CA (US)

(72) Inventors: Stephen R. Clarke, Orinda, CA (US); Michael John King, Oakland, CA (US); Brian Dougherty, Emeryville, CA (US); Michael David Hurwitz, Alameda, CA (US)

(73) Assignee: Aqua Metals Inc., Alameda, CA (US)

( * ) Notice: Subject to any disclaimer, the term of this patent is extended or adjusted under 35 U.S.C. 154(b) by 102 days.

(21) Appl. No.: 15/573,410

(22) PCT Filed: May 13, 2016

(86) PCT No.: PCT/US2016/032338
§ 371 (c)(1),
(2) Date: Nov. 10, 2017

(87) PCT Pub. No.: WO2016/183431
PCT Pub. Date: Nov. 17, 2016

(65) Prior Publication Data
US 2018/0127888 A1     May 10, 2018

Related U.S. Application Data

(60) Provisional application No. 62/160,850, filed on May 13, 2015.

(51) Int. Cl.
| | | |
|---|---|---|
| *H01M 4/16* | (2006.01) | |
| *H01M 4/68* | (2006.01) | |
| *C25C 1/18* | (2006.01) | |
| *H01M 10/06* | (2006.01) | |
| *C25C 5/02* | (2006.01) | |
| *H01M 4/14* | (2006.01) | |
| *B21J 1/06* | (2006.01) | |
| *B82Y 40/00* | (2011.01) | |
| *H01M 4/73* | (2006.01) | |
| *H01M 4/84* | (2006.01) | |
| *B21K 23/00* | (2006.01) | |

(52) U.S. Cl.
CPC .............. *C25C 1/18* (2013.01); *B21J 1/06* (2013.01); *B21K 23/00* (2013.01); *B82Y 40/00* (2013.01); *C25C 5/02* (2013.01); *H01M 4/14* (2013.01); *H01M 4/16* (2013.01); *H01M 4/68* (2013.01); *H01M 4/73* (2013.01); *H01M 4/84* (2013.01); *H01M 10/06* (2013.01); *Y02W 30/84* (2015.05)

(58) Field of Classification Search
None
See application file for complete search history.

(56) References Cited

U.S. PATENT DOCUMENTS

| | | | |
|---|---|---|---|
| 292,753 A | 1/1884 | Kessler et al. | |
| 647,426 A * | 4/1900 | Salom | B21D 3/10 |
| | | | 29/2 |
| 1,148,062 A | 7/1915 | Tucker et al. | |
| 1,334,419 A | 3/1920 | Tainton | |
| 1,752,356 A | 4/1930 | Smith et al. | |
| 1,759,494 A | 5/1930 | Tainton | |
| 1,911,604 A | 5/1933 | Calbeck | |
| 1,942,208 A | 1/1934 | Gamichon | |
| 2,166,367 A | 7/1939 | Norris | |
| 2,655,472 A | 10/1953 | Hilliard et al. | |
| 3,153,590 A * | 10/1964 | Storchheim | C22C 1/04 |
| | | | 29/2 |
| 3,262,868 A | 7/1966 | Juda | |
| 3,395,010 A | 7/1968 | Shoeld | |
| 3,616,277 A | 10/1971 | Adamson | |
| 3,647,545 A * | 3/1972 | Mao | C22C 11/02 |
| | | | 429/245 |
| 3,772,003 A | 11/1973 | Gordy | |
| 3,860,509 A | 1/1975 | Emmett, Jr. | |
| 4,035,242 A | 7/1977 | Brandt | |
| 4,097,354 A | 6/1978 | Ginatta | |
| 4,107,007 A | 8/1978 | Gaumann | |
| 4,118,219 A | 10/1978 | Elmore et al. | |
| 4,128,460 A | 12/1978 | Nishimura et al. | |
| 4,159,231 A | 6/1979 | Smith et al. | |
| 4,222,769 A | 9/1980 | Okuda et al. | |
| 4,229,271 A | 10/1980 | Prengaman et al. | |
| 4,269,810 A | 5/1981 | Kolakowski | |

(Continued)

FOREIGN PATENT DOCUMENTS

| | | |
|---|---|---|
| CA | 1308057 | 9/1992 |
| CA | 1310837 | 12/1992 |

(Continued)

OTHER PUBLICATIONS

Wu et al, Fundamental study of lead recovery from cerussite concentrate with methanesulfonic acid (MSA), Hydrometallurgy, vol. 142, Feb. 2014, pp. 23-35 (Year: 2014).*
Buzatu et al., "Studies on mathematical modeling of the leaching process in order to efficiently recover lead from the sulfate/oxide lead paste," Waste Management, Feb. 2017; 60:723-733.
Carlos, et al., "Study of the influence of glycerol on the cathodic process of lead electrodeposition and on its morphology," J. Power Sources, Jan. 2001; 92:56-64.
Carlos et al., "Voltammetric study of lead electrodeposition in the presence of sorbitol and morphological characterization," May 2003; 117:179-186.
Carlos, et al., "Voltammetric and morphological study of lead electrodeposition on copper substrate for application of a lead-acid batteries," J. Power Sources, May 2004; 132(1-2):261-265.

(Continued)

*Primary Examiner* — Harry D Wilkins, III
(74) *Attorney, Agent, or Firm* — Umberg Zipser LLP

(57) ABSTRACT

The inventive subject matter is directed to continuous electrochemical production of highly pure micro- or nanostructured lead that at least partially encloses the electroprocessing solvent and molecular hydrogen and optional guest compounds to form a mixed matrix. Such compositions are particularly suitable for cold forming of various structures and/or for alloy and composite material production.

15 Claims, 3 Drawing Sheets

(56) References Cited

U.S. PATENT DOCUMENTS

| | | |
|---|---|---|
| 4,460,442 A | 7/1984 | Ducati |
| 4,650,553 A | 3/1987 | Felgendreger et al. |
| 4,652,349 A | 3/1987 | Behringer et al. |
| 4,769,116 A | 9/1988 | Olper et al. |
| 4,849,059 A | 7/1989 | Deresh et al. |
| 4,927,510 A | 5/1990 | Olper et al. |
| 4,944,851 A | 7/1990 | Cordani et al. |
| 5,106,466 A | 4/1992 | Olper et al. |
| 5,124,008 A | 6/1992 | Rendall et al. |
| 5,230,779 A | 7/1993 | Martin |
| 5,211,818 A | 11/1993 | Masante et al. |
| 5,262,020 A | 11/1993 | Masante et al. |
| 5,429,661 A | 7/1995 | Khodov et al. |
| 5,514,263 A | 5/1996 | Spijkerman et al. |
| 5,520,794 A | 5/1996 | Gernon |
| 5,750,019 A | 5/1998 | Olper |
| 5,827,347 A | 10/1998 | Margulis |
| 5,928,488 A | 7/1999 | Newman |
| 6,183,619 B1 | 2/2001 | Gillman et al. |
| 6,428,676 B1 | 8/2002 | Onuoha |
| 6,679,471 B2 | 1/2004 | Domeier et al. |
| 6,860,983 B2 * | 3/2005 | Bellino ............... C22B 23/043 204/270 |
| 7,368,043 B2 | 5/2008 | Mohanta et al. |
| 7,507,496 B1 | 3/2009 | Kinsbursky |
| 8,323,595 B1 | 12/2012 | Smith et al. |
| 8,409,421 B2 | 4/2013 | Olper et al. |
| 8,580,414 B2 | 11/2013 | Clarke |
| 2004/0004003 A1 | 1/2004 | Hesse |
| 2004/0140222 A1 | 7/2004 | Smedley et al. |
| 2004/0222085 A1 | 11/2004 | Mohanta et al. |
| 2006/0091017 A1 | 5/2006 | Lam |
| 2008/0128293 A1 | 5/2008 | Mohanta et al. |
| 2010/0043600 A1 | 2/2010 | Martini |
| 2011/0033760 A1 | 2/2011 | Clarke |
| 2011/0083970 A1 | 4/2011 | Olper et al. |
| 2011/0265969 A1 | 11/2011 | Liu et al. |
| 2014/0131219 A1 | 5/2014 | Fassbender et al. |
| 2014/0131220 A1 | 5/2014 | Fassbender et al. |
| 2015/0368750 A1 | 12/2015 | Spence |
| 2016/0294024 A1 | 10/2016 | Clarke et al. |
| 2016/0308261 A1 | 10/2016 | Tyagi et al. |
| 2017/0159191 A1 | 6/2017 | Clarke et al. |
| 2017/0352927 A1 | 12/2017 | Dougherty et al. |
| 2018/0069276 A1 | 3/2018 | Clarke et al. |
| 2018/0127852 A1 | 5/2018 | Clarke et al. |
| 2018/0355494 A1 | 12/2018 | Clarke et al. |

FOREIGN PATENT DOCUMENTS

| | | | |
|---|---|---|---|
| CN | 1470675 A | 1/2004 | |
| CN | 1846005 A | 10/2006 | |
| CN | 101012514 A | 8/2007 | |
| CN | 101250720 A | 8/2008 | |
| CN | 101335370 A | 12/2008 | |
| CN | 101899576 A | 12/2010 | |
| CN | 101918600 A | 12/2010 | |
| CN | 101956214 A | 1/2011 | |
| CN | 102146572 A | 8/2011 | |
| CN | 102560535 B | 7/2012 | |
| CN | 1026188884 | 8/2012 | |
| CN | 103509949 A | 1/2014 | |
| CN | 104039991 A | 9/2014 | |
| CN | 104532302 A | 4/2015 | |
| CN | 105981212 A | 9/2016 | |
| CN | 107112606 A | 8/2017 | |
| EP | 0038366 | 10/1981 | |
| EP | 0724306 | 7/1996 | |
| FR | 2207997 A1 | 6/1974 | |
| IN | 59250 | 12/1957 | |
| JP | 5493626 | 7/1979 | |
| JP | 5848645 | 3/1983 | |
| JP | H9-13189 | 1/1997 | |
| JP | 2001-017942 A | 1/2001 | |
| SU | 1151595 A | 4/1985 | |
| SU | 1675393 A1 * | 9/1991 | ............... C25C 1/18 |
| WO | 9214866 A1 | 9/1992 | |
| WO | 9533756 A1 | 12/1995 | |
| WO | 9966105 A1 | 12/1999 | |
| WO | 2007044852 A2 | 4/2007 | |
| WO | 2008044852 A1 | 4/2008 | |
| WO | 2013152260 A1 | 10/2013 | |
| WO | 2014076544 A1 | 5/2014 | |
| WO | 2014076547 A1 | 5/2014 | |
| WO | 2015057189 A1 | 4/2015 | |
| WO | 2015077227 A1 | 5/2015 | |
| WO | 2015084950 A1 | 6/2015 | |
| WO | 2016081030 A1 | 5/2016 | |
| WO | 2016130675 A1 | 8/2016 | |
| WO | 2016183428 A1 | 11/2016 | |
| WO | 2016183429 A1 | 11/2016 | |
| WO | 2016183431 A1 | 11/2016 | |
| WO | 2017096209 A1 | 6/2017 | |

OTHER PUBLICATIONS

International Preliminary Report on Patentability for Application No. PCT/US2014/066142, dated Mar. 8, 2016; 43 pgs.

International Search Report and Written Opinion for Application No. PCT/US2014/066142, dated Mar. 24, 2015; 16 pgs.

International Preliminary Report on Patentability for Application No. PCT/US2016/032334, dated Aug. 28, 2017; 14 pgs.

International Search Report and Written Opinion for Application No. PCT/US2016/032334, dated Sep. 12, 2016; 17 pgs.

Second Written Opinion for Application No. PCT/US2016/032334, dated May 22, 2017; 4 pgs.

International Preliminary Report on Patentability for Application No. PCT/US2016/032332, dated Sep. 4, 2017; 26 pgs.

International Search Report and Written Opinion for Application No. PCT/US2016/032332, dated Sep. 12, 2016; 18 pgs.

International Preliminary Report on Patentability for Application No. PCT/US2015/030626, dated Mar. 7, 2017; 12 pgs.

International Search Report and Written Opinion for Application No. PCT/US2015/030626, dated Sep. 10, 2015; 16 pgs.

International Preliminary Report on Patentability for Application No. PCT/US2016/064697, dated Feb. 19, 2018; 18 pgs.

International Search Report and Written Opinion for Application No. PCT/US2016/064697, dated Mar. 10, 2017; 14 pgs.

Atanasova et al., "Desulpherization of lead cake by sodium carbonate and sodium hydroxide," Journal of the University of Chemical Technology and Metallurgy, 2008; 43(2):267-272.

Bandanoiu et al., "Study Concerning PbO Solubility in NaOH Solution for th eTreatment of Sulfate-oxide Pastes Ibtained fro Dismantling used Lead-acid Batteries," Rev. Chem., Jan. 2013; 64(9):1004-1010.

Birk, "Lead, Pb2+", http://www.public.asu.edu/~jpbirk/qual/qualanal/lead.html, Feb. 2002, accessed on May 9, 2018, evidence of existence as prior art supported by https://web.archive.org/web/20020209174305/http://www.public.asu.edu/~jpbirk/qual/qualanal/lead.html.

Genders, David, "Electrochemical Salt Splitting," Electrosynthesis, Watts New Quarterly Newsletter, Sep. 1995:1(1); 8 pgs.

International Preliminary Report on Patentability for PCT/US2016/032338 dated May 18, 2017; 7 pgs.

International Search Report and Written Opinion for PCT/US2016/032338 dated Oct. 21, 2016; 17 pgs.

Jordan, Manfred, "Chapter 8—Electrodeposition of Lead and Lead Alloys," Modern Electroplating, Fifth Edition; 2010 John Wily & Sons, Inc.; pp. 249-263.

Li et al. "Electrodeposited lead dioxide coatings," Chemical Society Reviews, 2011, vol. 40; pp. 3879-3894.

Madkour, L. "Electrolytic separation of lead and its dioxide from carbonate ore residiuum," Indian J. Chem Tech; Nov. 2, 1995(6):343-344.

Malak et al., "Comparative analysis of two processes for desulphurization of battery paste," JAMME, Dec. 2012; 55(2):855-859.

Nguyen et al., "More Environmental Friendly Method of Lead Recycling from Waste Battery Paste—an Electrochemical Investi-

(56) References Cited

OTHER PUBLICATIONS gation," 2003, Annual Report of FY 2002. The core University program between Japan Society for the Promotion of Science (JSPS) and National Centre for Natural Science and Technology (NCST); pp. 38-45.

Pletcher, et al., "A novel flow battery—A lead-acid battery based on an electrolyte with soluble lead (II): V. Studies of the lead negative electrode," Journal of Power Sources, 2008; 180:621-629.

Sun et al., "Structural and Morphological Evolution of Lead Dendrites During Electrochemical Migration," Scientific Reports, Nov. 15, 2013; 3(3227); 6 pgs.

Tyagi, "A zero lead pollution and economical recycling process for lead-acid batteries utilizing electrowinning in basic medium," 4th International Lead Conference, http://4islc.conferenceworks.eom.au/presentations/a-zero-lead-pollution-and-economical-recycling-process-for-lead-acid-batteries-utilizing-electrowinning-in-basic-medium/, Downloaded Oct. 13, 2015, 2 pages.

Vaysgant et al., "A low-temperature technique for recycling lead/acid battery scrap without wastes and with improved environmental control," Journal of Power Sources, Feb. 1995; 53(2):303-306.

Wong et al, "Lead electrodeposition from very alkaline media," Electrochemica Acta, Nov. 2005; 51(4):619-626.

Walsh et al., "Versatile electrochemical coatings and surface layers from aqueous methanesulfonic acid," Surface & coatings Tech, 2014; 259:676-697.

Notification of the First Office Action for China Application No. 201680080516.9, dated Jul. 2, 2019, 09 Pages.

Buzatu et al., "Processing oxidic waste of lead-acid batteries in order to recover lead," Asia-Pac. J. Chem. Eng., 2015; 10:125-132.

Gircis et al., "Electrochemical phenomena in aqueous electrowinning of lead," Journal of Applied Electrochemistry, 1987; 17:1234-1245.

Lyakov et al., "Desulphurization of damped battery paste by sodium carbonate and sodium hydroxide," Journal of Power Sources, 2007; 171:960-965.

Ferracin et al., "Lead recovery from a typical Brazilian sludge of exhausted lead-acid batteries using an electrohydrometallurgicalprocess, Hydrometallurgy", Sep. 2002; 65(2-3):137-144.

Sonmez et al., "Leaching of waste battery paste components. Part 1: Lead citrate sythesis from PbO and PbO2," Hydrometallurgy, Jan. 2009; 95(102):53-60.

\* cited by examiner

ELECTRODEPOSITED LEAD COMPOSITION, METHODS OF PRODUCTION, AND USES

This application claims priority to U.S. provisional application having Ser. No. 62/160,850, which was filed May 13, 2015, and which is incorporated by reference herein.

FIELD OF THE INVENTION

The field of the invention is metal compositions and methods therefor, particularly as they relate to lead, lead alloy, and lead composite compositions, and cold-forming of metallic objects comprising same.

BACKGROUND

The background description includes information that may be useful in understanding the present invention. It is not an admission that any of the information provided herein is prior art or relevant to the presently claimed invention, or that any publication specifically or implicitly referenced is prior art.

Lead acid batteries (LABs) are the single largest class of batteries used today. They are essential for applications ranging from starting automobile engines, providing emergency back-up power for data centers, and powering industrial and recreational vehicles such as fork lift trucks and golf carts. Unlike any other battery type, LABs are almost 100% recycled rendering lead the single most recycled commodity.

Notably, all or almost all of the current commercial lead recycling from LABs is still based on lead smelting, which is a pyro-metallurgical process in which lead, lead oxides, and other lead compounds are heated to about 1600° F. and mixed with various reducing agents to remove oxides, sulfates, and other non-lead materials. Unfortunately, current lead smelting is a highly polluting process, generating significant airborne waste (e.g., lead dust, $CO_2$, arsenic. $SO_2$), solid waste (e.g., lead containing slag), and substantial amounts of liquid waste (e.g., lead contaminated sulfuric acid, arsenic salts), and continual pollution issues have forced the closure of many smelters in the US and other Western countries. Still further, lead smelting operations produce lead in bulk form, typically as ingots, which require significant processing to transform the ingots into other form factors. Moreover, where production of lead alloys or composite materials is desired, ingots need to be re-melted and mixed with another element or component.

To circumvent issues associated with smelting operations, lead can be electrolytically recovered from solution in various acid based processes. For example, U.S. Pat. No. 4,927,510 teaches a recycling process in which desulfated battery paste is treated with fluoboric or fluosilicic acid to form an electrolyte from which lead is plated onto a cathode. However, the fluoboric or fluosilicic acid are highly aggressive solvents and are environmentally problematic. To help circumvent such problems. MSA (methane sulfonic acid) can be employed as a lead bearing electrolyte as described in WO2014/076547. Here, lead is plated from MSA at the cathode as a thick deposit. Similarly, U.S. Pat. No. 7,368,043 teaches an acidic electrolytic lead recovery process in which lead is plated from relatively low lead concentrations as a thick film on a cathode of a dedicated electrolytic flow-through cell. Unfortunately, these acidic electrolytic processes lead to deposition of metallic lead in a film that is difficult to remove. In addition, and once removed, the lead films require yet again significant efforts to convert the recovered metallic lead into suitable form factors, and will require re-melting for alloy or composite material production. Moreover, as is not uncommon in electrowinning, power outages during plating will lead to re-dissolution of the plated lead back into the electrolyte, which adversely affects economics of the process.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Electrochemical recovery of metallic lead can also be performed from substantially neutral solutions (pH 6-7) as described in U.S. Pat. No. 8,409,421. Here, lead is carried in an ammonium chloride containing electrolyte and passed through a flow-through electrochemical cell that produces non-adherent metallic sponge lead entrained in the electrolyte. However, while the process is generally environmentally benign and produces metallic lead that is not deposited in a sheet, the process consumes various reagents, runs at elevated temperatures, is relatively complex, and therefore economically less attractive. Moreover, so produced metallic sponge lead is relatively coarse, can clog the electrochemical flow-through reactor and is susceptible to oxidation throughout the process. In addition, residual electrolyte will include ammonium chloride, which may interfere with various downstream uses of the metallic lead product. For example, residual ammonium chloride reacts with lead salts to form fulminating compounds.

In still further known solution-based lead recovery processes, lead is recovered from an alkaline solution at a cathode as scarcely adherent spongy lead having relatively small particle sizes (about 20 micron) as described in U.S. Pat. No. 4,107,007. Notably, the lead was reported to float on the electrolyte when formed in an electrolyte with certain additives. However, the '007 process requires significant quantities of such additives, and especially polyol additives to increase the solubility of the lead compounds and to influence the form of the precipitate of the galvanically deposited and precipitated lead. Unfortunately, while the so produced lead has a relatively small particle size, the lead quality is poor as reported in U.S. Pat. No. 8,409,421, likely due to the presence of the additives. Thus, lead products from so produced processes fail to have a required purity.

Consequently, even though numerous processes are known in the art to produce lead in a metallic form from an electrochemical process, all or almost all of them fail to produce sufficiently pure lead. Moreover, and especially where the lead was produced as a relatively fine grained material, the so produced lead is subject to passivation/oxidation, and may also include additives that are detrimental to downstream processing. Still further, none of the know lead compositions were reported suitable for use in cold forming of various structures, let alone in cold forming of various alloys. Therefore, there is still a need for improved lead compositions and methods therefor.

SUMMARY OF THE INVENTION

The inventive subject matter is directed towards various methods, compositions, and devices that employ electrochemically produced lead in which the so produced lead has high purity, low oxidation/passivation, and is cold formable and readily forms alloys and non-alloy composite materials at temperatures well below the melting point of lead.

In one aspect of the inventive subject matter, the inventors contemplate a method of forming a lead structure that includes a step of providing a lead composite that comprises solid lead having a purity of at least 98 mol %, molecular hydrogen, and a solvent, wherein the solid lead, the hydrogen, and the solvent form a micro- or nanoporous mixed matrix. Another step in such methods includes a introducing the lead composite into a structured mold and forming the lead structure in the mold at a temperature below a melting temperature of lead, wherein at least some of the solvent and the molecular hydrogen is removed from the lead composite during or before the step of forming the lead structure in the mold.

The inventors also contemplate a method of actively cold-forming a substantially grain-free metallic object that includes a step of providing a lead composite that comprises solid micro- or nanostructured lead having a purity of at least 98 mol %, wherein an electroprocessing solvent and molecular hydrogen are disposed within the composite to form a micro- or nanoporous mixed matrix. In another step, at least some of the electroprocessing solvent and the hydrogen are removed from the micro- or nanoporous mixed matrix, and in yet a further step the solid micro- or nanostructured lead is fused in a patterned mold at a temperature below a melting temperature of lead to so produce the substantially grain-free metallic object.

Additionally, the inventors also contemplate a method of passively cold-forming a substantially grain-free metallic object that includes a step of forming in a patterned mold a lead composite comprising solid micro- or nanostructured lead having a purity of at least 98 mol %, wherein an electroprocessing solvent and molecular hydrogen are disposed within the composite to form a micro- or nanoporous mixed matrix, and wherein at least part of the patterned mold operates as a cathode. In another step, at least some of the electroprocessing solvent and the hydrogen are removed from the mixed matrix, and in a still further step, the solid micro- or nanostructured lead is fused at a temperature below a melting temperature of lead to so produce the substantially grain-free metallic object having a shape corresponding to the patterned mold.

Therefore, viewed from yet another perspective, the inventors contemplate a method of making a lead composite material that includes a step of forming on a cathode from an electroprocessing solvent comprising ionic lead and a guest compound a lead composite comprising solid micro- or nanostructured lead having a purity of at least 98 mol %, wherein the micro- or nanostructured lead at least partially encloses the electroprocessing solvent, the guest compound, and molecular hydrogen to form a micro- or nanoporous mixed matrix. In another step, at least some of the electroprocessing solvent and the hydrogen are removed from the micro- or nanoporous mixed matrix to thereby form the lead composite material.

Alternatively, the inventors also contemplate a method of making a lead composite material that includes a step of forming on a cathode from an electroprocessing solvent comprising ionic lead a lead composite comprising solid micro- or nanostructured lead having a purity of at least 98 mol %, wherein the micro- or nanostructured lead at least partially encloses the electroprocessing solvent and molecular hydrogen to form a micro- or nanoporous mixed matrix. In another step, at least some of the electroprocessing solvent in the micro- or nanoporous mixed matrix are replaced with a solvent comprising a guest compound, and in yet another step at least some of the solvent and/or electroprocessing solvent and the hydrogen are removed from the micro- or nanoporous mixed matrix to thereby form the lead composite material.

In some aspects of the inventive subject matter, the solvent in the lead composite has a pH of equal or less than pH 5.0, and/or the micro- or nanoporous mixed matrix has a density of less than 8 g/cm$^3$, and more typically of less than 5 g/cm$^3$, and most typically less than 3 g/cm$^3$. Therefore, the lead composite may comprises a guest compound, and especially contemplated guest compounds include a metal in elemental form and carbon allotropes. For example, suitable guest compounds include metallic copper, metallic nickel, metallic magnesium, metallic tin, metallic calcium, a graphene, and a fullerene.

Thus, contemplated lead composites may have a formula of $Pb_l(H_2)_m(MSA)_n(Q)_p$, wherein MSA is methane sulfonic acid, and wherein Q is a metal in elemental form or a carbon allotrope, and wherein l, m, n, and p denote molar fractions, wherein l and n are independently between 0.1 and 1, m is between 0.05 and 0.0005, and q is between 0.001 and 0.1. Due to the presence of hydrogen as a reducing agent, it is also contemplated that equal to or less than 1 mol % of lead (but more than $10^{-6}$ mol %) in the lead composite is oxidized.

In further aspects of the inventive subject matter, the step of introducing or forming the lead composite into the structured mold may comprise a step of pressing, spraying, injection molding, printing, or die casting the lead composite, and/or the step of removing at least some of the solvent and the molecular hydrogen comprises a step of compressing the lead composite, heating the lead composite, or subjecting the lead composite to a solvent exchange. Most typically (but not necessarily), the mold is configured to allow forming the lead structure into a grid or current collector and the mold may further include a reticular or porous scaffold material (e.g., an insulator, a polymeric material, or a glass material) into which the lead composite is formed.

Consequently, the inventors contemplate a lead composite material that comprises a solid micro- or nanostructured lead having a purity of at least 98 mol % and shaped as a micro- or nanoporous matrix having a plurality of void spaces, wherein the matrix further comprises molecular hydrogen, a guest compound, and an electroprocessing solvent all disposed within the void spaces to so form a micro- or nanoporous mixed matrix.

Most typically, the mixed matrix will have a density of less than 8 g/cm$^3$, and/or the solvent has a pH of equal or less than pH 5.0. Where desired, the guest compound may be a metal in elemental form or a carbon allotrope, such as metallic copper, metallic nickel, metallic magnesium, metallic tin, metallic calcium, a graphene, and a fullerene.

Viewed from a different perspective, the inventors therefore also contemplate a lead composite material having a formula of $Pb_l(H_2)_m(MSA)_n(Q)_p$, wherein MSA is methane sulfonic acid, and wherein Q is the guest compound, and wherein l, m, n, and p denote molar fractions, wherein l and n are independently between 0.1 and 1, m is between 0.05 and 0.0005, and q is between 0.001 and 0.1.

As noted above, Q may be a non-metal or a metal in elemental form, including metallic copper, metallic nickel, metallic magnesium, metallic tin, metallic calcium, a graphene, and a fullerene. Moreover, it is contemplated that p may be 0.

Various objects, features, aspects and advantages of the inventive subject matter will become more apparent from the following detailed description of preferred embodiments, along with the accompanying drawing figures in which like numerals represent like components.

DETAILED DESCRIPTION

The inventor have discovered that metallic lead can be easily produced in high purity using an electrolytic process in which the so formed lead features nano- and/or micro-porous structures entrapping hydrogen gas and electroprocessing solvent that protect the ultra-high surface of the lead from oxidation or passivation to a significant degree. The lead is formed at the cathode from an lead ion containing electroprocessing solvent in the shape of solid micro- and/or nano-structured lead having a purity of at least 98 mol %, and more typically at least 99 mol %. Moreover, as the metallic lead can be formed in an acid electrolyte without the use of additives, contamination of the lead with organic additive compounds is advantageously avoided.

While not wishing to be bound by any theory or hypothesis, the inventors contemplate that the micro- and nano-structured lead is shaped as dendritic (e.g., needle, branch, or tree-like structures) material that forms a complex three dimensional network in which molecular hydrogen ($H_2$) and electroprocessing solvent is removably entrapped. In still further contemplated aspects, the micro- and/or nano-structured lead may also be shaped as superconductive nanowires. Due to the nano- and/or micro-porous structure, the resulting material is particularly suitable for cold forming into any desirable shape. Indeed, when the so produced lead composite was pressed into a smaller volume, most if not all of the hydrogen and electroprocessing solvent was readily expelled. Advantageously, the so compressed material was substantially monolithic without significant appearance of grain boundaries otherwise present where high-surface lead particles are subject to passivation or oxidation. Consequently, the conductivity of materials so produced is significantly improved. Moreover, due to the initial inclusion of electrolyte in the nano- and/or micro-porous structures, alloys and non-alloy composite structures can be prepared in a conceptually and practically simple and effective manner at temperatures well below the melting point of lead. Such inclusion of guest compounds (e.g., other metals and various non-metal components) can be simply done via their inclusion into the electroprocessing solvent, or by replacement of the electroprocessing solvent with another solvent comprising the guest compound(s).

Figure 1:
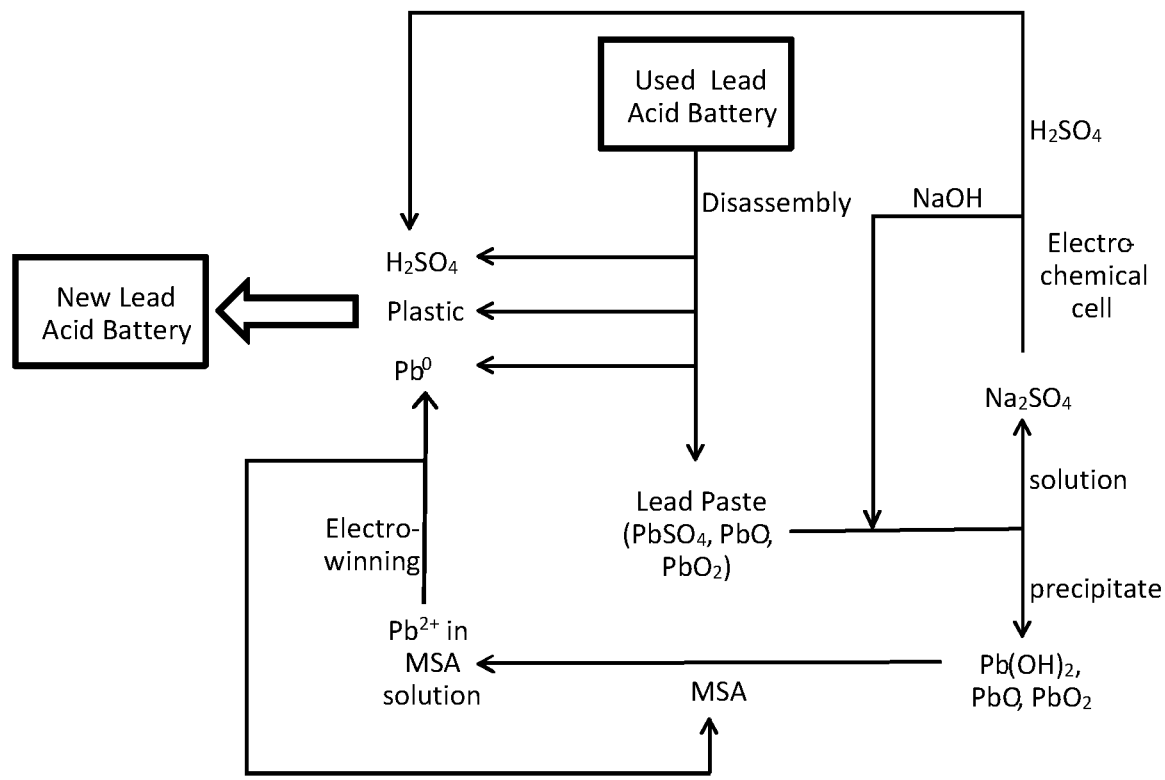
FIG. 1 is an exemplary schematic of a solution-based lead recycling process to produce lead compositions according to the inventive subject matter.

One exemplary process to produce lead composites comprising solid micro- and/or nanostructured lead is schematically illustrated in FIG. 1. Here, used lead acid batteries are ground and crushed to a relatively small size, followed by removal of plastic parts and battery acid. The so obtained lead scrap material will predominantly contain grid lead and active material lead (i.e., positive active material, negative active material, typically predominantly containing lead oxide, lead dioxide, and lead sulfate), which can then be washed to separate metallic lead (in grid and active materials to some degree) from the active material lead. It should be appreciated that the manner of washing may vary depending on the particular process employed. For example, where the active material is entirely dissolved using an acid solvent and chelator, metallic lead can be directly washed with the electroprocessing solvent. On the other hand, where the active material lead is first subjected to a desulfurization step, the washing step may be performed using a base (e.g., using sodium hydroxide or sodium carbonate) that will advantageously lead to a precipitate of all ionic lead species in the active material. Either way, cleaned solid grid lead can be extracted from the wash step and pressed into lead chips/ingots to so yield grid lead that can be directly reused or further refined.

Where no desulfurization of the active material is performed, the acid electrolyte that also includes a chelator (e.g., methane sulfonic acid (MSA) and EDTA) is enriched in lead ions and may then be treated to remove other non-lead ions (e.g., zinc, calcium, tin, silver, etc.). Suitable methods of such removal include selective ion exchange resin, other selective adsorbent, selective electrodeposition, liquid chromatography and/or precipitation. Regardless of any optional pre-processing, the lead ion-enriched electrolyte solution is then fed to an electrolyzer to recover the lead in metallic form as is further discussed in more detail below. While any type of electrolyzer is generally deemed suitable, especially preferred electrolyzers will include those without separator or membrane between the cathode and the anode, and with a cathode that moves relative to the electrolyte. After reduction of the lead ions, the process will yield a high-purity solid lead (i.e., at least 98% purity, or at least 99% purity, or at least 99.5% purity) that forms a micro- or nanoporous mixed matrix enclosing hydrogen ($H_2$) and electrolyte. Where the electrolyzer has one or more moving electrodes, and especially rotating disk electrodes, lead is deposited as adherent but non-film forming lead as also discussed in more detail below.

In such process, the inventors surprisingly discovered that all relevant lead species found in active material lead are effectively and quickly dissolved in MSA where the MSA includes substantial quantities of a chelator (2-8%, preferably 5% by weight) at an acidic pH (i.e., at a pH equal or less than 7.0, equal or less than 6.0, equal or less than 5.0, equal or less than 4.0, or equal or less than 3.0). For example, an aqueous solution of MSA and EDTA did dissolve positive active material (e.g., lead sulfate, and especially tri/tetrabasic lead sulfate; $PbSO_4 \cdot 3PbO \cdot H_2O / PbSO_4 \cdot 4PbO \cdot H_2O$) as well as negative active material (e.g., lead oxide ranging from Pb(II) to Pb(IV) and multiple partial oxidation states between them). Moreover, it was observed that under dissolving conditions for the active material lead, grid lead (e.g., metallic lead from contacts, bus bars, lead alloys for battery grids, etc.) is not dissolved but instead cleaned by the electroprocessing solvent. Such finding was particularly unexpected as known processes involving lead dissolution in MSA characterized lead sulfate as being only sparsely soluble in MSA. Therefore, among other benefits of using a chelator (and especially EDTA) in MSA, it should be noted that EDTA synergistically and dramatically enhanced solubility of lead sulfates in MSA. Consequently, it should be recognized that using the electroprocessing solvent of the inventive subject matter, active material lead can be processed without the need for prior desulfurization.

Alternatively, where desulfurization of the active material is performed as shown in FIG. 1, the crushed/ground lead acid battery material is mixed with water, and the plastic pieces are floated off the solution. Remaining metallic lead is separated from the active materials and reacted with a base (e.g., sodium hydroxide) to generate lead hydroxide and lead (di)oxide precipitates. Sulfate is removed from the precipitate as $Na_2SO_4$ solution. After the lead hydroxide and oxides are isolated as precipitate, the precipitate is then dissolved in a suitable electroprocessing solvent (e.g., MSA), and subjected to electrowinning as described below. After electrowinning, the electroprocessing solvent can be recycled for a further round of dissolving lead hydroxide/lead oxide as is shown in FIG. 1. Advantageously, it should be appreciated that sulfuric acid can be recovered from the $Na_2SO_4$ solution by an electrolytic process that also generates sodium hydroxide, which can be reused in the desulfurization step. Most notably, the inventors discovered that the MSA can be recycled back into the process without purification. However, mechanical processing (e.g., filter, centrifuge, hydrocyclone, etc.) to remove any solids, and/or chemical processing (e.g., by precipitation of sulfates, for example, to produce calcium or strontium sulfate), and/or adsorptive processing (e.g., activated charcoal, ion exchange resin, etc.) is also expressly contemplated herein. It should also be recognized that in such process (with prior desulfurization of the active material lead) ultimately all lead species from the active material lead can be processed as ionic lead in the electrolyte, even where no EDTA or other chelator or additive is used. Thus, and viewed from a different perspective, it should be noted that the electroprocessing solvent for lead recovery has an acidic pH (typically equal or less than pH 5.0, or equal or less than pH 4.0, equal or less than pH 3.0) and allows for lead reduction at the cathode without the use or need for a chelator or additive (e.g., polyol or carbohydrate), and that the so produced lead had micro- or nanometer sized structures rather than forming a film. Further details and considerations of process conditions and materials suitable for use herein are described in WO 2015/077227 and PCT/US15/30626, which are incorporated by reference herein.

Figure 3A:
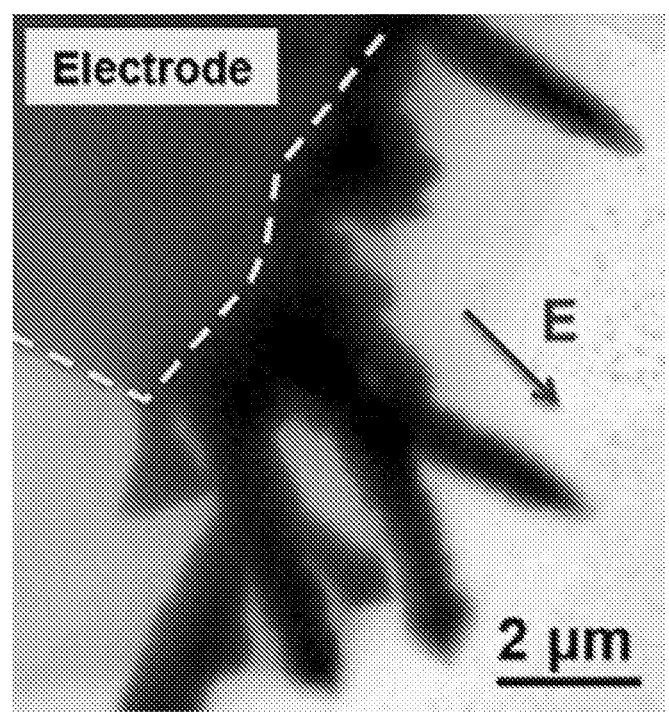
FIGS. 3A and 3B are exemplary TEM images of lead micro- and/or nanostructured lead thought to be produced by the inventive process.
Figure 3B:
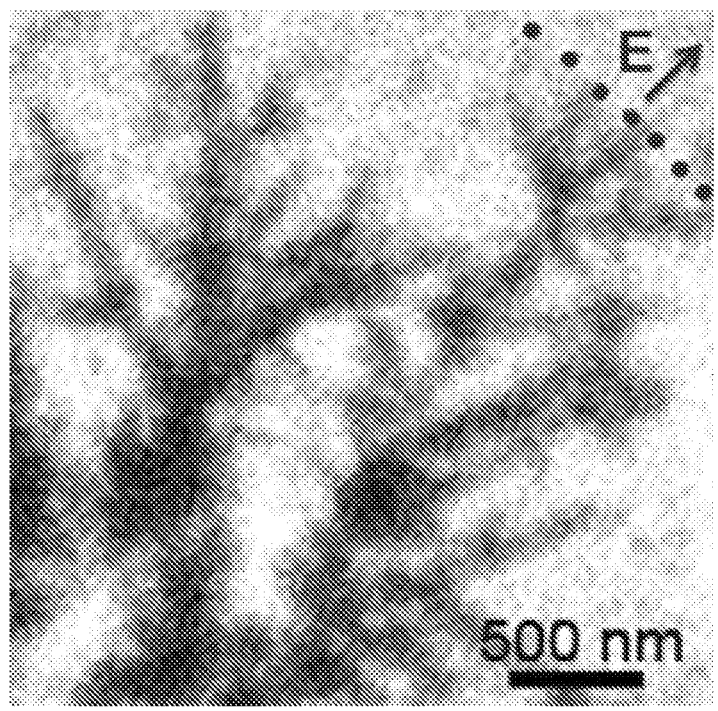

Surprisingly, the inventors now discovered that the so produced lead formed a micro- and/or nanoporous mixed matrix in which the lead formed micro- or nanometer sized structures. In contemplated embodiments of the inventive composition, these structures were individual and separate particles, which may be sterically (but not chemically) locked to each other, wherein the longest dimension of each particle may be between 5-50 nm, 50-100 nm, 100-500 nm, and 500-1,000 nm. Likewise, the micrometer-dimensioned particles may range between 1-5 μm, 5-15 μm, 15-50 μm, 50-100 μm, 100-500 μm, and 500-1,000 μm. In further contemplated aspects, the matrix comprises dendritic structures and needles/wires, which may be discreet, connected, or associated in a loose three dimensional network. Exemplary images depicting lead dendritic structures thought to be produced by the processes presented herein as shown in FIGS. 3A and 3B (taken from *Sci Rep.* 2013; 3: 3227; 1-6). However, macroscopic lead composites comprising such solid micro- or nanostructured lead that forms a micro- or nanoporous mixed matrix will typically be in the range of 0.5-5 mm, or between 5-20 mm, or between 20-50 mm (as measured in the longest dimension. Indeed, macroscopic lead composites can further aggregate into large masses, and the actual size of such mass is only limited by the supply of the material.

It should further be appreciated that the matrix trapped some of the electroprocessing solvent and a substantial quantity of molecular hydrogen (i.e., $H_2$). The hydrogen may be coordinated to the lead as molecular or dissociated hydrogen, or even through weak but non-covalent association. Notably, the hydrogen appeared to inhibit passivation and oxidation of the metallic lead. Therefore, it should be recognized that even though the bulk of the matrix likely comprises elemental lead with a remarkably high surface area, the mixed matrix will typically comprise less than 0.10 wt % lead oxides, more typically less than 0.01 wt % lead oxides, and most typically less than 0.001 wt % lead oxides. Thus, and viewed from a different perspective, a passivation layer comprising lead oxide is expected to amount to less than 0.0001 $g/cm^2$ of the lead surface area. Thus, it is contemplated that less than 0.1%, more typically less that 0.01%, and most typically less than 0.001% of all lead that is exposed to the surface is present as lead oxide. It should be especially recognized that such low amount of oxidation is particularly unexpected as the surface to mass ratio of the nano- and micro-structured materials is rather high. Moreover, due to the presence of hydrogen entrapped in the micro- or nanoporous mixed matrix, the density of the mixed matrix is significantly reduced and in most embodiments has a density of less than 8 $g/cm^3$, or less than 7 $g/cm^3$, or less than 5 $g/cm^3$, or less than 3 $g/cm^3$, or even less than 1 $g/cm^3$. Consequently, at least a portion of the mixed matrix will be buoyant in the electrochemical processing solvent. Notably, as hydrogen is generated at the cathode, the inventors contemplate that the hydrogen is entrapped or at least partially enclosed in the network or open-cell structure of the mixed matrix. While not limiting to the inventive subject matter, hydrogen in the mixed matrix will typically be in lower molar quantities than lead, and most typically lead is present in the mixed matrix in molar excess of between 10-50 fold, or between 50-100 fold, or between 100-200 fold, or between 200-500 fold.

As noted before, it is therefore contemplated that the hydrogen will also provide a protective or even reducing atmosphere at the surface of solid micro- or nanostructured lead. Thus, it is contemplated that equal to or less than 1 mol %, or equal to or less than 0.1 mol %, or equal to or less than 0.01 mol %, or equal to or less than 0.001 mol % of lead in the lead composite will oxidized. Such low degree of passivation or oxidation is particularly desirable as lack of oxidation allows not only formation of monolithic structures but also avoids grain boundaries otherwise occurring at an oxide surface. Visually, such matrix had a black slushy appearance and a remarkably low bulk density. Indeed, in some of the embodiments, the mixed matrix was buoyant on the electroprocessing solvent. Upon compressing the matrix or application of other force, the density increased (e.g., 1-3 $g/cm^3$, or 3-5 $g/cm^3$, or higher) and a metallic silvery sheen appeared.

As will be readily appreciated, the produced mixed matrix will also include a portion of the electroprocessing solvent entrapped within the network of the solid micro- and/or nanostructured lead. However, it should be noted that the solvent can readily drain from the mixed matrix, and where the mass of accumulated mixed matrix is relatively large (e.g., at least 1 cm in the longest dimension), the mixed matrix will begin to collapse under its own weight and express at least some of the solvent and hydrogen.

In still further contemplated aspects, it should be recognized that at least part of the electroprocessing solvent may also include other metals and/or non-metal components that will then be included in the nano- and/or microporous structures. Consequently, it should be appreciated that various metal alloys and non-alloy composite structures may be produced by performing the process in a suitably modified electroprocessing solvent. For example, the electroprocessing solvent may include one or more metals. It should be appreciated that where an additional metal is included in the electroprocessing solvent, such metal may be present in metallic (i.e., uncharged) form or in form of an ion that may be reduced to a metal at the cathode (e.g., directly on the cathode, or indirectly, via reduction on metallic lead in the nano- and/or microporous structures). For example, suitable metals include metallic or ionic copper, nickel, magnesium, tin, and calcium. Due to the relatively small feature size in contemplated nano- and/or microporous structures, it should be appreciated that where the metal is present in elemental form, the metal will typically have a size that is suitable for inclusion into the mixed matrix. Therefore, elemental metals may have a size of between 5 and 50 nm, between 50 and 500 nm, between 100 and 250 nm, or between 250 and 750 nm, or between 0.5 µm and 5 µm, between 5 and 50 µm, between 50 and 250 µm, or between 200 and 500 µm, or even larger. Moreover, it should be appreciated that more than one type (ionic and metallic) or kind (e.g., copper and tin) may be present in the electroprocessing solvent. With respect to the concentration of the guest metal it is contemplated that the guest metal may be in molar excess to lead, equimolar ratio, and most commonly in a concentration that is less than lead. Most typically, the guest metal may be present in the electroprocessing solvent to yield an alloy with between about 0.1 mol % to 10 mol % of the guest metal relative to lead.

Likewise, where a non-metallic component is used, it should be appreciated that such non-metallic component is included in the electroprocessing solvent at a size and in an amount suitable for trapping the non-metallic component in the nano- and/or microporous structures, and the same considerations as provided above for the metals apply. For example, especially preferred non-metal compounds include various carbon allotropes (e.g., glassy carbon, nanotubes, graphene, fullerene, etc.), metal oxides (especially ceramic compounds), polymers, and all reasonable mixtures thereof.

Additionally, it should also be appreciated that the guest compound can be washed-in via a solvent exchange process that removes at least a portion of the electroprocessing solvent and replenishes the matrix with another solvent that includes the guest compound. Such solvent replacement is particularly advantageous where the guest compound would not be compatible with electrolytic deposition of the lead at the cathode or operating conditions at the anode (e.g., where the guest compound would plate onto the cathode before reduction of the lead ions), or where the guest compound is not be compatible with the electroprocessing solvent. For example, it is contemplated that the electroprocessing solvent is washed out with an intermediate solvent to maintain the mixed matrix, and that the intermediate solvent is then washed out with the solvent carrying the guest compound. Where appropriate, however, the washing step may be entirely omitted. For example, the mixed matrix may be dried to evaporate the solvent, and the new solvent may then be used to introduce one or more guest compounds.

Suitable electroprocessing solvents in contemplated processes (preferably MSA) will dissolve most or all active lead materials, including lead oxide and lead hydroxide. Moreover, the same solvent can, upon loading with lead ions, be subjected to an electrolysis process that allows continuous production of high-purity lead while regenerating the electroprocessing solvent for a further dissolving cycle. It should be apparent that the electroprocessing solvent should be stable and not decompose under electrowinning conditions.

In particularly preferred aspects of the inventive subject matter, the electroprocessing solvent comprises an alkane sulfonic acid, and most preferably methane sulfonic acid. With respect to the alkane sulfonic acid it should be appreciated that numerous alkane sulfonic acids are deemed suitable for use herein. However, MSA is especially preferred as this compound is environmentally friendly and stable under electrolytic conditions used. However, other suitable alkane sulfonic acids include ethyl sulfonate, propylene sulfonate, trifluro methyl sulfonate (triflic acid), sulfamic acid, etc. In less preferred aspects, the solvent may also comprise a perchlorate, a hexafluorosilicate, a tetrafluoroborate, an amidosulfonate, etc.

In most circumstances, the MSA or other alkane sulfonic acid will be present in a significant concentration, typically at least 1-5 wt %, more typically 5-15 wt %, even more typically 25-50 wt %, and most typically between 10 and 35 wt % of the electroprocessing solvent. Thus, suitable concentrations will typically be between 5 and 50 wt %, or between 20 and 30 wt % of the electroprocessing solvent. The pH of the electroprocessing solvent is most preferably acidic as noted above, and most typically between pH 5-7, or between pH 3-5, or between pH 1-3. Viewed form a different perspective, the pH of the electroprocessing solvent will be less than 6, or equal or less than 5, or equal or less than 3.

Similarly, the nature of the optional chelator any vary considerably. However, it is generally preferred that the chelator is a chelator that is selective or preferential for divalent cations. Therefore, EDTA may be partially or completely replaced by other chelating agents such as NTA (nitrilotriacetic acid), IDA (iminodiacetic acid), DTPA (diethylenetriamine-pentaacetic acid), etc. Regardless of the particular type of chelator, it is preferred that the chelator is typically present in an amount of at least 0.1-1 wt %, more typically 1-3 wt %, even more typically 3-10 wt %, and most typically between 2 and 8 wt % of the electroprocessing solvent. Furthermore, it is noted that the chelator may be provided in form of a salt where the chelator has otherwise reduced solubility in acidic solution (e.g., $Na_2$-EDTA). It should be noted that such concentrations may even exceed the solubility limit of the chelator. Suitable solvent are preferably aqueous and will most preferably be prepared from deionized water. However, additional co-solvents are also deemed suitable and include alcohols, various polyols (propylene glycol, polyethylene glycol etc.), brighteners, etc.

Therefore, contemplated lead composites have a formula of $Pb_l(H_2)_m(MSA)_n(Q)_q$, wherein MSA is methane sulfonic acid, and wherein Q is a metal in elemental form or a carbon allotrope, and wherein l, m, n, and p denote molar fractions, wherein l and n are independently between 0.1 and 1, m is between 0.05 and 0.0005, and q is between 0.001 and 0.1. Thus, the lead to hydrogen ratio is typically between 500:1 and 50:1, and most typically between 300:1 and 100:1. Viewed from a different perspective, l, m, n, and p may also be chosen such that the lead composite or mixed matrix will have a density of between 8-10 $g/cm^3$, or between 6-8 $g/cm^3$, or between 4-6 $g/cm^3$, or between 2-4 $g/cm^3$, or between 1-2 $g/cm^3$, or even less. Of course, it should be appreciated that numerous alternate solvents instead of MSA are also deemed suitable, and appropriate solvents include those noted above. Moreover, it should be noted that the guest compound Q may or may not be present.

Lead may be harvested from the mixed matrices by removing at least a portion (e.g., at least 90%, more typically at least 95%, and most typically at least 98%) of the solvent from the harvested material. Suitable methods of removing the solvent will include evaporation at standard temperature and pressure (STP), evaporation under reduced pressure (e.g., in a partial vacuum), by boiling, calcination, pyrolysis, electrolysis, compression, by sublimation or supercritical carbon dioxide extraction, chemical reaction, or solvent exchange with another solvent (which may or may not be removed). To preserve the content of unoxidized, elemental lead, it is noted that these processes can be conducted in an inert atmosphere (such as argon or nitrogen) to achieve at least partial solvent removal while preserving the exposed lead surfaces from passivating or other oxidation.

As is shown in Table 1 below, high purity lead (analysis after compression to remove solvent and hydrogen) was obtained at the cathode as a micro- or nanoporous mixed matrix having a density of less than 1 g/cm$^3$ (buoyant on the surface of the solvent). Moreover, the lead composition did not plate on the cathode as a solid and coherent film but was recovered as amorphous soft and compressible mixed material that contained the methane sulfonic acid and hydrogen.

TABLE 1

| Element | Quant. | Det. Limit | Actual |
|---|---|---|---|
| Bismuth | ppm, (µg/g) | 0.1 | 1.3 |
| Copper | ppm, (µg/g) | 0.1 | 1.1 |
| Lead | ppm, (µg/g) | 0.1 | Major (99.5%+) |
| Potassium | ppm, (µg/g) | 0.5 | 18 |
| Sodium | ppm, (µg/g) | 0.1 | 0.20 |
| Tin | ppm, (µg/g) | 0.2 | 30 |

Notably, the so obtained mixed material was different from conventional sponge lead that is normally produced using foaming agents or gas injection during cooling of liquid lead that was previously purified. Similarly, contemplated compositions were also distinct from sponge lead that is obtained by compressing small lead particles or obtained from alkaline electrolytic processes that employ chelating additives (e.g., polyols or various (di)carboxylic acids)

Therefore, it should be appreciated that the use of MSA and equivalent solvents (and an optional chelator) allowed for reduction of ionic lead at a pH of equal or less than pH 5 to an adherent, but not plated form of solid micro- or nanostructured lead. As used herein, the terms "adherent" or "weakly associated" in conjunction with metallic lead that was formed by reduction of ionic lead refers to a form of lead that is not a coherent film over the surface of the cathode, but that is amorphous and can be wiped off the cathode. In other words, a weakly associated or adherent lead product does not form in a macroscopic dimension. Intermetallic bonds between the cathode and the lead product and will therefore not form a coherent lead film on the cathode. For example, lead formed in a buoyant low density layer that was barely attached to the cathode, floated off a static plate cathode, and could be washed off the surface of a rotating cathode if electrolyte circulation is too aggressive. Moreover, the use of the alkane sulfonic acid (e.g., MSA) and an optional chelator (e.g., EDTA) allowed for stable electrolytic recovery of lead without significant destruction of the electrolyte (e.g., MSA) and chelator (e.g., EDTA).

Figure 2:
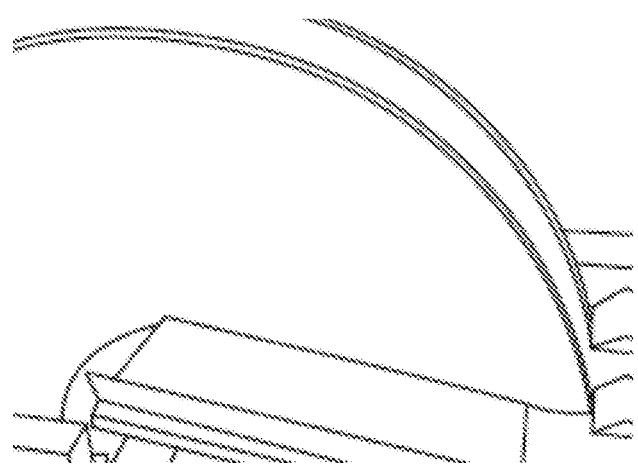
FIG. 2 is an exemplary detail view of a rotating cathode with lead compositions according to the inventive subject matter.

In further contemplated aspects of the inventive subject matter, and with respect to the electrodes in the electrolyzer, it should be appreciated that numerous electrodes are deemed suitable for use herein. Indeed, it should be noted that all conductive materials are considered suitable for use in conjunction with the teachings herein so long as such materials are compatible with the electrochemical conditions use in the process. Preferred electrodes are chemically stable at acidic pH and particularly include stainless steel, carbon, and aluminum. Examples of materials suitable for the anodes include graphite, titanium structures coated with precious metal oxides. Therefore, in at least some preferred aspects, suitable cathodes comprise one or more disk-shaped aluminum cathodes that are rotatably coupled to the electrolytic cell and that are in close proximity to the anode(s). FIG. 2 is a photograph showing a more detailed view of a pair of disk-shaped cathodes and wiper surface that is proximally positioned to the cathodes to so wipe the low-density lead material from the cathode surface in a non-peeling manner (i.e., without lifting a coherent lead sheet or coherent lead film from the cathode in a pulling motion). Such and other reciprocating electrodes are especially beneficial as they allow continuous production of high purity mixed matrix formation, typically in a configuration where lead ions are reduced on one part of the cathode while metallic lead is removed from another part of the same electrode.

Of course, it should be appreciated that the inventive subject matter is not limited to use of a disk-shaped electrode, but that in fact all electrodes are deemed suitable that allow active (e.g., using a wiping blade or surface) or passive removal (e.g., via bubbles, solvent jetting, or flotation) of high-purity lead from the cathode. Thus, suitable electrodes may be configured as simple plates that may be static relative to the solvent or moved in a reciprocal manner, or electrodes that can be continuously moved and that are configured to allow reduction of lead ions on one portion and lead removal on another portion. For example, suitable electrode configurations include conductive disks, cylinders, spheres, belts, etc. Likewise, it should be recognized that the number of cathodes may vary considerably, and that most typically multiple cathodes are operated in parallel (or serially, especially where the cathodes are static relative to the solvent).

Depending on the particular manner of forming the lead composite, cold-forming of various structures (e.g., metallic objects, especially conductive elements such as lead grid or current collectors) may be performed in a variety of manners. For example, cold forming may be performed by spraying, pressing, or injection molding the lead composite materials, the mixed matrices, and/or the micro- or nano-structured lead. As already discussed above, the materials used herein may comprise the lead in pure form or as an alloy or as a non-alloy composite. It should further be appreciated that the cold forming techniques include both active and passive processes, and exemplary active processes include pressing, spraying, injection molding, die casting, rolling, and extrusion, while typical passive processes include deposition and/or formation of mixed matrices on patterned cathodes.

Moreover, it should be appreciated that where the mixed matrices are used with electroprocessing (or other) solvent, the materials can be slurried up in a suitable solvent to so achieve proper concentration, flow characteristics, and/or to allow mixing with another slurry that may include more macroscopic lead composites or macroscopic composites comprising a metal other than lead. Likewise, non-lead components may also be admixed in such process. Thus, alloys and non-metal composite materials can be prepared before the step of forming an article from the mixed matrix (or matrices).

Advantageously, contemplated materials feature the ability to be cast and formed into a variety of shapes without grain boundaries by cold forming. It is contemplated that both active and passive means can be used to form the composition into the desired shapes. For example, mechanical force may be applied to the mixed matrix to remove the hydrogen and solvent while concurrently fusing the micro and nano structures to form a monolithic macrostructure having a desirable size and shape. Suitable mechanical methods include, but are not limited to, pressing, spraying, injection molding, die casting, rolling, extrusion, drawing, and forging. Thus, numerous configurations and shapes may be obtained such as grids, sheets, and wires without conventional melting and casting. The cold forming techniques may be used to produce conductive elements, especially grids for new lead acid batteries. Further contemplated uses include formulating inks that can be deposited using lithography techniques including laser printing and atomic force microscopic nanolithography.

On the other hand, the inventors also contemplate various cold forming processes by passive methods, and especially by depositing and/or forming mixed matrices on a patterned cathode. For example, a waffle or grid shaped cathode could be used to form grid lead for production of new lead acid batteries. Such in situ formation may be assisted by use of a reticular or porous scaffold material (e.g., an insulator, a polymeric material, or a glass material) into which the lead composite is formed. The grid shape could be made by machining or casting the aluminum into the desired complementary shape using traditional methods. The grid shape could also be formed by configuring the aluminum cathode with non-conductive materials, for example by embedding glass, plastics, or silicone rubbers in the aluminum surface.

Advantageously, the objects formed by these methods are expected to be free of grain boundaries as all metallic lead is covered and/or protected by the electroprocessing solvent and molecular hydrogen. This is especially beneficial in the case of alloys, where traditional processes produce alloys having coarse grain structures that arise from differential crystallization or solidification of individual metals. In contrast, alloys can be produced using intimate mixtures of the inventive materials without melting the metals, which will reduce grain formation and associated grain boundary issues. Indeed, alloys can be prepared for which no phase diagram is currently available. Likewise, various lead (and other metal) nano- and micro-porous materials may be used to produce monolithic metal objects with no grain boundaries due to the lack of passivation of the materials.

With respect to temperatures it is contemplated that cold forming can be performed at a temperature that is below the melting temperature of the metal used, and especially below the melting temperature of lead. Additionally, in at least some aspects, the temperature will advantageously also be below the boiling temperature of the electroprocessing solvent. Thus, suitable cold forming temperatures are typically above 0° C., more typically above 10° C., for example, between 15-50° C., or between 50-80° C., and preferably below 300° C., and more typically below 200° C. and most typically below 100° C. For example, preferred cold forming temperatures include those between 20-90° C. or between 20-60° C.

In yet additional aspects of the inventive subject matter, the inventors contemplate that other metal-based compositions can be produced from electrodeposition of ionic metals dissolved in an electroprocessing solvent that optionally includes a chelator. Advantageously, the material so produced may be used as a substrate in the cold-forming of lead objects. For example, in addition to forming nano- and micro-porous lead materials with entrapped hydrogen and electroprocessing solvents, it is contemplated that the methods described may also be used to produce analogous porous matrices from other metal ions. For example, nano- and microporous, indium, tin, lead, thallium, bismuth, cadmium, antimony, silver, zinc, copper, cobalt, and nickel may be produced by electrolytic reduction in the appropriate electroprocessing solvents (which may have optional chelators) and cathodes. Moreover, multi-metallic compositions may be formed by co-deposition of metal ions on the cathode as permitted by the redox potential or process sequence. Therefore, in another aspect of the inventive subject matter, mixed matrices of two or more metals may have a formula of $Me^1{}_r(H_2)_m(MSA)_n(Q)_p/Me^2{}_r(H_2)_m(MSA)_n(Q)_p$, with $Me^1$ being different than $Me^2$, and with the remaining variables as discussed above.

Thus, specific compositions of metal, electroprocessing solvent, and hydrogen, methods of producing said compositions, and the uses thereof have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of forming a lead structure, comprising:
providing a lead composite comprising solid metallic lead having a purity of at least 98 mol %, molecular hydrogen, and a solvent, wherein the solid metallic lead, the hydrogen, and the solvent form a micro- or nanoporous mixed matrix comprising less than 0.10 weight % lead oxides;
introducing the lead composite into a structured mold;
cold-forming the lead structure in the mold at a temperature below a melting temperature of lead; and
removing at least some of the solvent and the molecular hydrogen from the lead composite during or before the cold-forming of the lead structure in the mold;
wherein the lead composite further comprises a guest compound, wherein the guest compound is a metal in elemental form or a carbon allotrope, or wherein the guest compound is selected from the group consisting of metallic copper, metallic nickel, metallic magnesium, metallic tin, metallic calcium, a graphene, and a fullerene.

2. The method of claim 1 wherein the solvent in the lead composite has a pH of equal or less than pH 5.0.

3. The method of claim 1 wherein the micro- or nanoporous mixed matrix has a density of less than 8 g/cm$^3$.

4. The method of claim 1 wherein the guest compound is a metal in elemental form or a carbon allotrope.

5. The method of claim 1 wherein the lead composite has a formula of $Pb_l(H_2)_m(MSA)_n(Q)_p$, wherein MSA is methane sulfonic acid, and wherein Q is a metal in elemental form or a carbon allotrope, and wherein l, m, n, and p denote molar fractions, wherein l and n are independently between 0.1 and 1, m is between 0.05 and 0.0005, and p is between 0.001 and 0.1.

6. The method of claim 5 wherein equal to or less than 1 mol % of lead in the lead composite is oxidized.

7. The method of claim 1 wherein the step of introducing or forming the lead composite into the structured mold comprises a step of pressing, spraying, injection molding, printing, or die casting the lead composite.

8. The method of claim 1 wherein the step of removing at least some of the solvent and the molecular hydrogen comprises a step of compressing the lead composite, heating the lead composite, or subjecting the lead composite to a solvent exchange.

9. A method of actively cold-forming a metallic object, comprising:
providing a lead composite comprising solid micro- or nanostructured metallic lead having a purity of at least 98 mol %, wherein an electroprocessing solvent and molecular hydrogen are disposed within the composite to form a micro- or nanoporous mixed matrix comprising less than 0.10 weight % lead oxides;
removing at least some of the electroprocessing solvent and the hydrogen from the micro- or nanoporous mixed matrix; and
fusing the solid micro- or nanostructured metallic lead in a patterned mold at a temperature below a melting temperature of lead to so produce the metallic object without appearance of grain boundaries.

10. The method of claim 9 wherein the solvent in the lead composite has a pH of equal or less than pH 5.0.

11. The method of claim 9 wherein the lead composite further comprises a guest compound selected from the group consisting of a metal in elemental form or a carbon allotrope.

12. The method of claim 9 wherein the lead composite has a formula of $Pb_l(H_2)_m(MSA)_n(Q)_p$, wherein MSA is methane sulfonic acid, and wherein Q is a metal in elemental form or a carbon allotrope, and wherein l, m, n, and p denote molar fractions, wherein l and n are independently between 0.1 and 1, m is between 0.05 and 0.0005, and p is between 0.001 and 0.1.

13. The method of claim 12 wherein equal to or less than 1 mol % of lead in the lead composite is oxidized.

14. The method of claim 9 wherein the step of fusing the solid micro- or nanostructured metallic lead comprises a step of pressing, spraying, injection molding, printing, or die casting the lead composite.

15. The method of claim 9 wherein the mold is configured to allow forming the lead structure into a grid or current collector.

* * * * *